United States Patent
Vänskä et al.

(10) Patent No.: US 7,493,651 B2
(45) Date of Patent: Feb. 17, 2009

(54) REMOTELY GRANTING ACCESS TO A SMART ENVIRONMENT

(75) Inventors: Marko Vänskä, Shanghai (CN); Tommy Arnberg, Espoo (FI)

(73) Assignee: Nokia Corporation, Espoo (FI)

( * ) Notice: Subject to any disclaimer, the term of this patent is extended or adjusted under 35 U.S.C. 154(b) by 799 days.

(21) Appl. No.: 10/476,497

(22) PCT Filed: May 17, 2001

(86) PCT No.: PCT/US01/15955

§ 371 (c)(1),
(2), (4) Date: Apr. 21, 2004

(87) PCT Pub. No.: WO02/093502

PCT Pub. Date: Nov. 21, 2002

(65) Prior Publication Data

US 2004/0172396 A1    Sep. 2, 2004

(51) Int. Cl.
*G06F 7/04*    (2006.01)

(52) U.S. Cl. .......................................... 726/2

(58) Field of Classification Search .................. 726/2; 340/825; 380/270, 255; 713/150
See application file for complete search history.

(56) References Cited

U.S. PATENT DOCUMENTS

| | | | |
|---|---|---|---|
| 5,201,067 A | | 4/1993 | Grube et al. |
| 5,757,915 A * | | 5/1998 | Aucsmith et al. ........... 713/187 |
| 6,127,941 A | | 10/2000 | Van Ryzin |
| 6,792,466 B1 * | | 9/2004 | Saulpaugh et al. ......... 709/229 |
| 6,986,040 B1 * | | 1/2006 | Kramer et al. ............. 713/155 |
| 7,024,552 B1 * | | 4/2006 | Caswell et al. ............. 713/155 |
| 7,072,945 B1 * | | 7/2006 | Nieminen et al. .......... 709/217 |
| 2002/0103850 A1 * | | 8/2002 | Moyer et al. ............... 709/202 |
| 2003/0109938 A1 * | | 6/2003 | Daum et al. ................. 700/11 |

FOREIGN PATENT DOCUMENTS

| | | |
|---|---|---|
| EP | 0 733 999 | 9/1996 |
| EP | 0733999 | 9/1996 |
| EP | 1 045 355 | 10/2000 |
| EP | 1 061 692 | 12/2000 |
| GB | 2 344 675 | 6/2000 |
| GB | 2344675 | 6/2000 |
| WO | WO 98 41947 | 9/1998 |
| WO | WO9841947 | 9/1998 |
| WO | WO0067483 | 11/2000 |

\* cited by examiner

*Primary Examiner*—Emmanuel L Moise
*Assistant Examiner*—Ali S Abyaneh
(74) *Attorney, Agent, or Firm*—Banner & Witcoff, Ltd.

(57) ABSTRACT

A method and system for providing selective access to appliances by terminals in a smart environment is provided. Each terminal and appliance is assigned a unique identification code (UID). Appliances and terminals wirelessly transmit their UID and receive UIDs transmitted by other appliances and terminals. Upon receiving a terminal's UID, an appliance queries a database to determine whether the terminal is authorized to control that appliance based on authorization information stored in the database. An owner may be notified if a terminal without authorization attempts to control an appliance or enters the environment. When a previously unauthorized user, local to the environment, desires access to the smart environment while the owner(s) is away from the environment, a request may be securely transmitted to an owner at his or her remote location. The owner may grant access to one or more appliances, and securely transmit the authorization back to the local user. Upon receipt of the authorization, the local user may control the appliance(s).

16 Claims, 8 Drawing Sheets

| UID/MAC Address | Description | Group |
|---|---|---|
| 1123 | J. Smith – Personal Digital Assistant | Owner |
| 1124 | T. Smith – Mobile telephone | Owner |
| 0201 | Oven | Appliance |
| 0202 | Coffee Maker | Appliance |
| 0203 | Answering Machine | Appliance |
| 0204 | Lighting System | Appliance |
| 0220 | J. Smith, Jr. – Palm top computer | Family Member |
| 0230 | R. Jones – Personal Digital Assistant | Friend |
| 0250 | Television | Appliance |
| 0252 | Heating/Air Conditioning System | Appliance |
| 1372 | J. Smith's Computer System | Appliance |

FIG. 3A

| Appliance UID | Controller UID/ Group Name | Days Allowed | Times Allowed | Notes |
|---|---|---|---|---|
| 0201 | 1123 | 1,2,3,4,5,6,7 | 0:00 – 23:59 | Oven/Owner |
| | 1124 | 1,2,3,4,5,6,7 | 0:00 – 23:59 | Oven/Owner |
| | 0220 | NULL | NULL | Oven/Child |
| | 0230 | NULL | NULL | Oven/Friend |
| 0204 | Any | 1,2,3,4,5,6,7 | 0:00 – 23:59 | Any terminal can control |
| 0250 | Owner | 1,2,3,4,5,6,7 | 0:00 – 23:59 | TV/Owner |
| | Family Member | 1,2,3,4,5 | 19:00 – 21:00 | TV/Child M-F |
| | | 6,7 | 07:00 – 21:00 | TV/Child Weekend |
| | Friend | 1,2,3,4,5,6,7 | 09:00 – 20:00 | TV/Friend |
| ... | ... | ... | ... | ... |

FIG. 3B

| Appliance UID | Neighbor UIDs |
|---|---|
| 0201 | 0202, 0203 |
| 0202 | 0201, 0203 |
| 0203 | 0201, 0202 |
| 0204 | 0252 |
| 0250 | 1372 |
| 0252 | 0204 |
| 1372 | 0250 |

FIG. 3C

| Object UID | 9872349876 (Door) | 897345987 (TV) |
|---|---|---|
| Function ID | 1 (open) | 2 (change channels) |
| Validity Period | 19 Feb 2001 - 23 Feb 2001 | 3 (days from receipt of ticket definition) |
| Rights Level | 1 (business hours) | 4, 5, 7, 9, 20, 50 (channels) |

REMOTELY GRANTING ACCESS TO A SMART ENVIRONMENT

BACKGROUND OF THE INVENTION

The present invention relates generally to security. More particularly, the invention relates to a wireless lock and key system used to selectively prevent individuals from operating appliances when a predetermined set of criteria are met.

When access to an item, appliance, tool, or the like is to be restricted, generally a physical lock has been used. Locking the restricted item in a room behind a locked door is another known means to restrict access to an item or area. Conventional types of physical locks include combination locks and key locks, both commercially available on a widespread basis.

Combinations locks are well known. Combination locks open only when a user has entered the correct combination code, usually a sequence of numbers. However, combination locks have many shortcomings. Many combination locks have the combination set at the factory, and the combination cannot be changed by the purchaser of the lock. In addition, once a person is given the combination, it cannot be taken away. Thus the only way to restrict access to an individual who knows the combination is to physically change the lock, which requires redistributing the new combination to each of the other prior users of the lock other than the restricted individual. Also, because a person can communicate the correct combination an unlimited number of times, there is potentially an unlimited number of persons who might know the correct combination. Once an individual has received the combination, there are no means by which that individual can physically be restricted from communicating the combination to additional individuals. Combination locks also can't notify the owner if used without authorization.

Key locks are also known in the art. Key locks open only when the correct physical key is inserted into the lock and turned, thus opening the locking mechanism. Key locks, however, also have several disadvantages. Physical keys are easily copied, potentially allowing unwanted copies to be created and given to unauthorized individuals. Additionally, if all physical keys for a given lock are lost, a locksmith must be hired to create a replacement key, often at great cost to the lock owner. As with combination locks, the owner of the lock is generally not notified if the lock is opened by a user without authorization.

There is a common problem to both key and combination locks in that access is either all or nothing. That is, an individual either has access to the lock (i.e., has the key or knows the combination) or they do not. Also, there is no way to differentiate access between users. All users who have access have the same access. There is no way, using only one lock and key, to provide certain access privileges to a first user and other access privileges to a second user.

When an individual wants to restrict access to an appliance, such as a cable control box or controls on a television, conventional physical locks have generally been used by constructing a physical barrier over the controls, with access restricted by a lock. More recently, electronic parental control devices have been developed. These systems generally allow a user, using a handheld remote control device, to input a first code key that allows programs which meet a first set of predetermined criteria to be watched, and to input a second code key to allow programs which meet a second set of predetermined criteria to be watched. In this manner, children can be restricted from watching programs deemed not suitable by parents. However, this solution is only applicable to televisions and cable set top boxes. A parent cannot use these systems to restrict access to other appliances in the household.

Another known means of restricting access to appliances, again with respect to televisions, is the use of the V-chip, which is well known in the art. The V-chip, however, only restricts access to a television, and not to additional appliances such as computers, ovens, stoves, lights, and the like.

Access to computers has been restricted using specialized software installed on the computer system. However, these software packages also only restrict use of the computer system, and not of other appliances.

A lock and key system is needed that restricts access to multiple appliances while providing ease of adaptability by providing differing access levels to different users. A system is needed that allows an owner to give other people such as family members, houseguests, etc., differing rights to use different appliances, gives the owner a method to control who can use appliances and when they can use them, and gives the owner immediate notification if an appliance is used against his or her authority.

SUMMARY OF THE INVENTION

In a first aspect of the invention, there is a method of remotely granting access to appliances in a smart environment. The method includes a set of steps. A controlling terminal receives access information from an appliance. The controlling terminal sends an access request to an administrator terminal, based in part on the access information. The controlling terminal receives access authorization from the administrator terminal.

In some embodiments, the method contains additional steps. The controlling terminal sends the access authorization to the appliance, sends a control command to the appliance, and the appliance performs the requested control command.

In some embodiments, the method includes the steps of updating a central database with the access authorization.

In some embodiments the access information comprises an authorization template specific to the appliance.

In some embodiments the access information comprises contact information for the administrator terminal.

In some embodiments, communications between the appliance, the controlling terminal, and the administrator terminal use public key, private key encryption.

In another aspect of the invention, there is a method of verifying a recipient of a set of access rights using public key, private key encryption. A first terminal hashes data corresponding to a definition of access rights associated with a second terminal. The first terminal encrypts the hash and the second terminal's public key, using the first terminal's private key. An appliance receives the encrypted hash and public key with the data corresponding to the definition of access rights. The appliance decrypts, using the first terminal's public key, the received encrypted hash and public key. The decrypted public key is compared to a trusted copy of the second terminal's public key. The appliances hashes the data and compares the hash with the decrypted hash from the previous steps.

In another aspect of the invention, there is a method of remotely granting access to an appliance. An appliance prohibits access by a controlling terminal. The controlling terminal sends an access request to an administrator terminal through a network. A server receives an authorization for access from the administrator terminal. The authorization comprises modified access rights for the controlling terminal. A central authorization database in the server is updated with information from the modified access rights, and a remote authorization database in the controlling terminal is synchronized with the central authorization database. The authorization information in the remote authorization database is sent to the appliance, and the appliance grants control to the controlling terminal based on the authorization information.

In another aspect of the invention, there is a method of remotely granting access to appliances. An appliance prohibits access by a controlling terminal. The controlling terminal sends an access request to an administrator terminal through a network. The controlling terminal receives an authorization for access from the administrator terminal, wherein the authorization comprises access right information corresponding to the controlling terminal. The access rights are send to the appliance. The appliance grants control to the controlling terminal, and the access rights are synchronized with a central authorization database.

In some embodiments, communications between the controlling terminal, the administrator terminal, and the appliance use public key, private key encryption.

In another aspect of the invention, there is a method of remotely granting access to an appliance. An appliance prohibits access by a controlling terminal. The controlling terminal sends an access request to an administrator terminal through a network. A server receives an authorization for access from the administrator terminal, wherein the authorization comprises access rights information corresponding to the controlling terminal. A central authorization database in the server is updated with the access rights information. A remote authorization database is synchronized with the central authorization database. Authorization information in the remote authorization database is sent to the appliance, and the appliance grants control to the controlling terminal based on the authorization information.

In another aspect of the invention, there is a device for use in a smart environment. The device includes a processing unit, a transceiver, and a memory comprising computer readable instructions that, when executed by the processor, cause the device to perform a set of steps. The device sends a first control request to an appliance, receives an authorization template from the appliance, sends an authorization request to an administrator terminal, receives authorization rights from the administrator terminal, and sends a second control request to the appliance. The second control request comprises the received authorization rights and a control command.

In another aspect of the invention, there is an appliance for use in a smart environment. The appliance includes a transceiver, a processing unit, and a memory comprising computer readable instructions that, when executed by the processor, cause the appliance to perform a set of steps. The steps include receiving a first control request from a control terminal, sending an authorization ticket to the control terminal, and receiving authorization information from the control terminal. The authorization information comprises authentication information and a modified authorization ticket comprising authorization rights. The steps also include using the authentication information to verify that the authorization rights were granted by an administrator terminal to the control terminal, receiving a control command from the control terminal, and when the authorization rights were granted by the administrator terminal, performing the received control command.

In some embodiments, verification of the authorization rights includes the steps of decrypting an encrypted public key using an administrator terminal's public key, and comparing the decrypted public key to a trusted copy of the control terminal's public key.

In another aspect of the invention, there is a method of granting access rights to a terminal. The method includes the steps of a user terminal receiving a definition of rights from an appliance, the user terminal sending the definition of rights to an administrator terminal, the administrator terminal modifying the definition of rights to include access rights associated with the user terminal, the administrator terminal sending the modified definition of rights to the user terminal, the user terminal sending the modified definition of rights to the appliance, the user terminal sending a control command to the appliance, and the appliance executing the control command.

BRIEF DESCRIPTION OF DRAWINGS

FIG. 3A shows Unique Identifier (UID) Information.
FIG. 3B shows a portion of Access Rights Information for the UIDs of FIG. 3A.
FIG. 3C shows Neighbor UID Information for the UIDs of FIG. 3A.

DETAILED DESCRIPTION OF PREFERRED EMBODIMENTS

Wireless connections between devices are becoming more and more widespread. The present invention uses wirelessly connected devices to create a smart environment, e.g. homes where the various household appliances are controlled remotely by one or more controlling terminals. The terminals communicate with and control appliances using a wireless technology such as Bluetooth, wireless LAN, or Home RF. Any wireless communication technology can be used.

The invention may be embodied in a system that allows the owner of an environment to control and monitor who is using and when each person can use each appliance. The inventive system may also notify the owner whenever someone who does not have rights to use the appliances within the environment attempts to use one or more of the appliances, or optionally when a user without access rights enters the environment. The notification may be sent by a short message service (SMS), email, direct network access, instant message, alphanumeric pager, WAP (wireless application protocol) service, or the like.

In a smart environment, an environment owner is often concerned that the environment can only be controlled by those that are trusted and have been given authority by the owner. The "owner" of the environment is a person that has administrative rights to the environment. This may be the actual owner or anybody he or she has authorized to act as an administrator. The owner(s) can limit the access rights and times of each user to each appliance.

Throughout this specification, the term "appliance" is used to refer to any item controlled or operated by a user, generally using a terminal (but not required, as discussed below). Examples of appliances include, but are not limited to, televisions, video cassette recorders and players, DVD players, conventional ovens, microwave ovens, kitchen appliances, lighting systems, heating systems, air conditioning systems, garage door openers, lawn sprinkler systems, stereo equipment, cable television boxes, video game consoles, computers, and the like. A user using a controller terminal can control each appliance for which the user has the proper access rights. Throughout this specification, the terms "controller" and "terminal" are used interchangeably to describe a wireless-enabled device that is used to operate or control appliances. The terminal may be a computer system, palm-top computer, personal digital assistant, mobile phone, or any other device with wireless communication capabilities.

Figure 1:
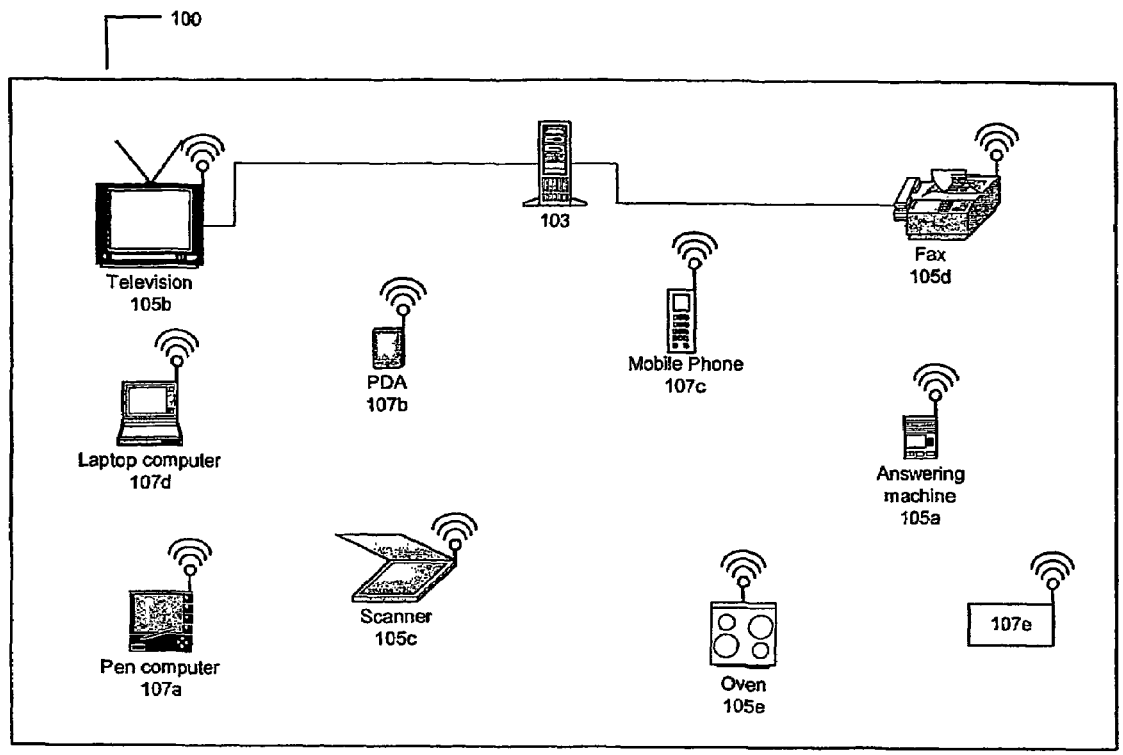
FIG. 1 shows a smart environment.
Figure 2A:
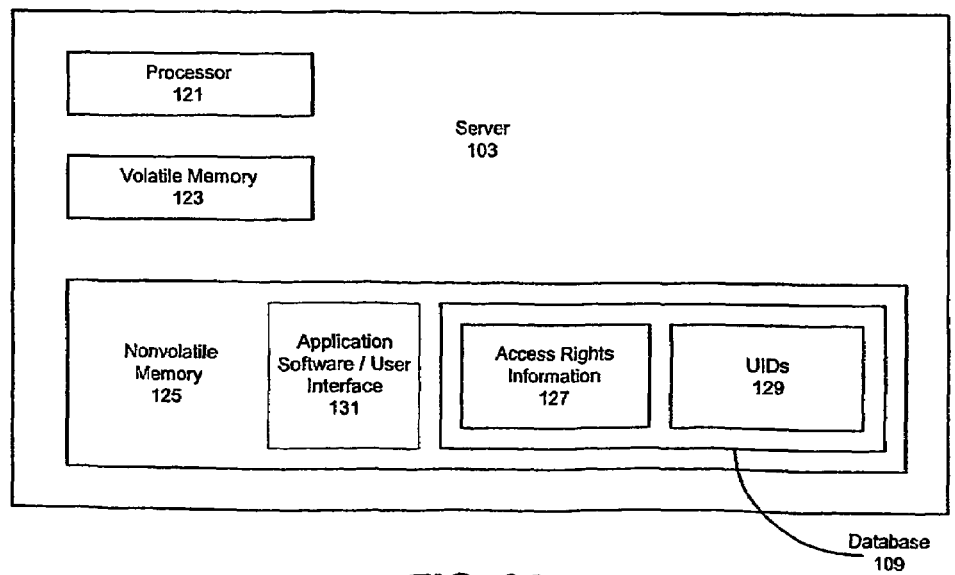
FIG. 2A shows a block diagram of a server.
Figure 2B:
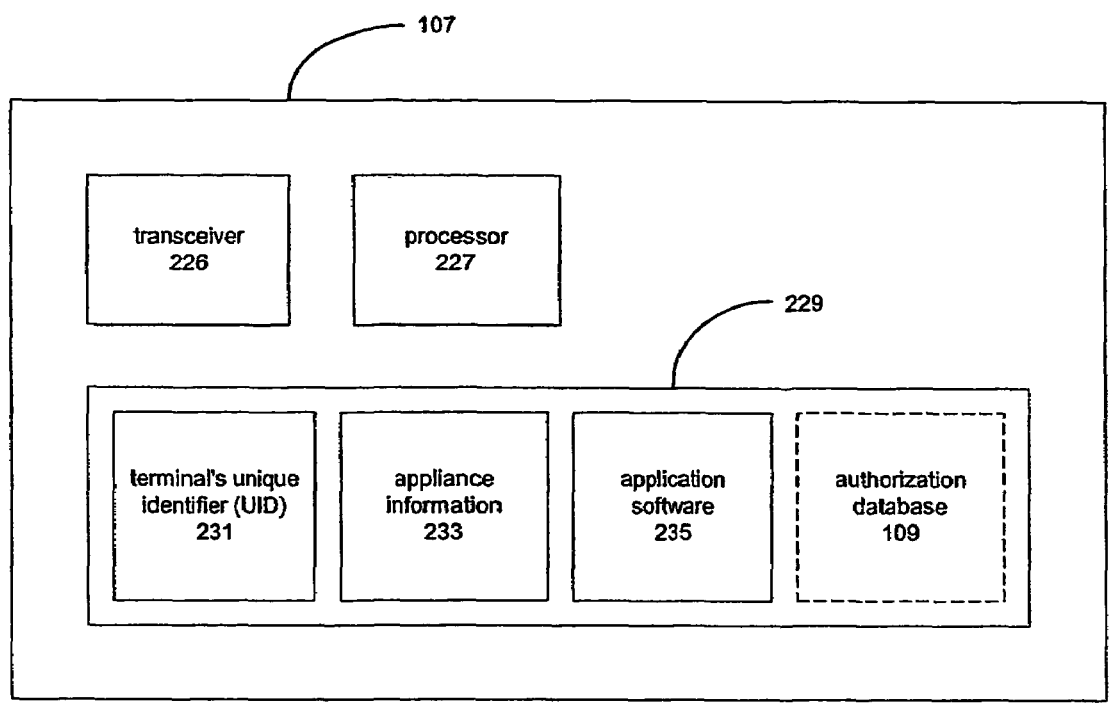
FIG. 2B shows a block diagram of a terminal.
Figure 2C:
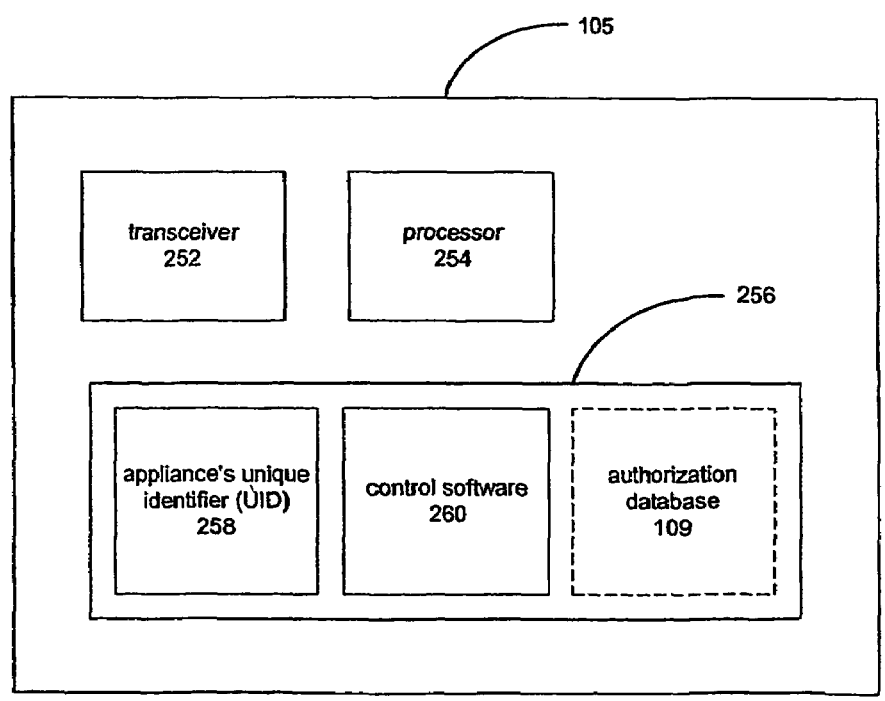
FIG. 2C shows a block diagram of an appliance.

With reference to FIGS. 1-3, a smart environment 100 may comprise a central server 103, appliances 105a-105e, and wireless controller terminals 107a-107e. Additional appliances and terminals may easily be added. The number of terminals or appliances in an environment is limited only by physical space. Appliances may communicate with server 103 using the wireless communication technology used throughout the environment, or via conventional network cabling. Unless terminals are docked in a docking station (not shown) connected to the server, terminals generally communicate with the server via wireless communications.

The server 103 is comprised of a processor 121, volatile memory 123, and nonvolatile memory 125. A database 109 is stored within the nonvolatile memory of server 103. In another variation, a third party provides the server functions, including storage of the database 109, over a network such as the Internet. It is further possible that the database is stored in one or more mobile terminal(s). A terminal in which the database is stored is referred to herein as a database terminal. When the database is stored in a mobile terminal, the other appliances and terminals generally must have a connection to the terminal in which the database is stored. The connection may be by any communication means, such as WLAN, Bluetooth, GSM via short message service (SMS), or the like. Storing the database in a terminal provides additional security because, if the terminal is removed from the environment, the appliances may become useless.

Authorization information is stored in the database and comprises unique identifier (UID) information 129 and access rights information 127, as described below. Optionally (shown in FIG. 3C), neighbor UID information may be included in the database as well. Application software 131, including an optional user interface for modifying access rights information and UID information, may also be stored in non-volatile memory 125.

Each terminal 107 has a wireless transceiver 226, a processor 227, and a memory 229. The transceiver is used for sending and receiving information such as UIDs and control information. The processor 227 is used for executing computer readable instructions 235 stored in memory 229. The memory also stores the terminal's UID 231, appliance information 233, and optionally, authorization database 109.

Each appliance 105 has a wireless transceiver 252, a processor 254, and a memory 256. The transceiver is used for sending and receiving information such as UIDs and control information. The processor 254 is used for executing computer readable instructions 260 stored in memory 256. The memory also stores the appliance's UID 258 and, optionally, authorization database 109.

Each wireless terminal and appliance is assigned a unique identification code (UID), which may comprise the Media Access Control (MAC) address for each wirelessly networked device. The UIDs are stored in database 109, optionally along with each UID's group access level (e.g., owner, administrator, family member, friend, employee, visitor, etc.). A UID information table is shown in FIG. 3A. In FIG. 3A, the terminals with UIDs 1123 and 1124 are owner terminals. The terminal with UID 0220 belongs to a child J. Smith, Jr. in the group "Family Member," and the terminal with UID 0230 belongs to R. Jones in the group "Friend." Other UIDs belonging to appliances are also shown.

The UIDs of any terminal and appliance may be automatically exchanged according to network protocols when they are within wireless communication range. The appliance may use the UID for a query of database 103 in order to determine whether the terminal has rights to command that appliance. The terminal may use the UID to load information regarding how to control the appliance being accessed by the terminal.

Appliances generally have a second user interface, in addition to the terminal interface, so they can be controlled physically as well as through the terminals. For example, a coffee machine may include an on/off switch so that a user may just flip the switch to turn the coffee machine on when no terminal is present. In some aspects of the invention, physical controls are disabled when it is determined that a user's terminal does not have authority to access the appliance, or when no terminal is present.

Each appliance may be associated with access rights for specified terminals. The access rights information 127 is stored in database 109, and may be modified via a user interface with the database over a computer network, such as the Internet. A sample access rights information table is shown in FIG. 3B. The owner may provide differing access rights for different appliances and/or terminals under different sets of predetermined criteria. Access rights may be terminal based, time based, or both. Terminal based access rights are rights wherein specified terminals can always access the appliance, and other terminals can never access the appliance. Time based access rights are rights wherein terminals may only access the appliance during predetermined times, and at all other times are restricted from accessing or controlling the appliance. Terminal and time based access rights are rights wherein each terminal is provided a predetermined range of time that it may access or control a specified appliance.

For example, as shown in FIG. 3B, in a smart environment within a home, one user's (owner terminal with UID 1123) terminal may have access rights to the television and oven at all times. However, a second user's (Family terminal with UID 0220, for instance, a child) terminal may have access rights to the television only from 7:00 pm-9:00 pm on Monday through Friday and from 7:00 am-9:00 pm on weekends, and have no access to the oven. A third user's (Friend terminal with UID 0230, for instance, a babysitter) terminal might have access to the television only from 9:00 am-8:00 pm regardless of the day of the week, and have no access to the oven. As shown in FIG. 3B, access rights may be terminal-specific or group-specific. For instance, any terminal in the Owner, Family Member, or Friend group will have the same access to the television as every other terminal in their respective group. However, each terminal is given specific access to the oven. Thus, one family member (for instance, an older child, not shown) may have access to the oven while a second family member (a younger child, shown) may not have any access to the oven. It is also possible to further base access rights by week, month, etc, such that access rights could vary by weeks of the month, months of the year, etc.

It is also possible that some appliances may be set to have no access restrictions, but rather the only requirement is that a terminal be present for the appliance to be used or controlled. For instance, as shown in FIG. 3B, an owner may give all users the right to switch the lights on or off. In these cases there is no need to determine whether the terminal has authorization, or even if it is known. It is enough that the terminal is in the environment, and so it will have the right to switch the lights on or off. Optionally, the appliance may query the database to determine whether the terminal at least has access rights within the environment before allowing the user to control the appliance.

When an appliance is added to an environment, the appliance is branded to that environment That is, the appliance records the identity of its environment so that it can differentiate its own environment from other environments. This allows the appliance to determine whether it is has been moved to a different environment. The identity of the environment may be established by recording UIDs transmitted by appliances near the new appliance (neighbor appliances). For example, appliance 105e (oven) knows that it is near appliances 105a (answering machine) and 105c (scanner). Each appliance may store its own neighbor information into a flash-memory, which can only be cleared by a terminal with authority to so (owner terminal or special maintenance device). The neighbor UID information may also be stored collectively in database 109, a sample of which is shown in FIG. 3C.

After branding, only an owner can move the appliance out of the environment, or the appliance may not function. Optionally, even within the environment the appliance cannot be moved, except by the owner. The appliance may determine that it has been removed from its environment by determining that different neighbor appliances are surrounding it. In observing its wireless surroundings, an appliance may infer that it has been stolen if the surroundings dramatically change (e.g., more than two different neighbor appliances are detected than expected). If an appliance is stolen or otherwise taken from its own environment, it may optionally lock itself and refuse to operate until unlocked. In that event, generally an owner key may be required to unlock the appliance. The appliance may also attempt to contact its owner (not the owner of the environment in which it is now located) in order to notify the owner that it has been removed from its environment.

In an embodiment using a database terminal, a secure link between the database terminal and the appliance is created when adding a new appliance to the environment. This allows the appliance to securely determine whether the controlling terminal has rights, i.e., that the controlling terminal is a trusted database terminal. Putting the database terminal and the appliance physically close to each creates the secure link. The appliance and the database terminal exchange their public keys or other encryption data Thereafter the appliance and terminal will listen and communicate only to each other, such that the appliance can be safely added to the environment.

In network topographies where the database is stored in a central server or in another location, a mobile terminal, e.g., an owner terminal, and the newly added appliance are similarly branded as when the database is stored in the mobile terminal. That is, the owner terminal and the appliance establish a secure link as in the above example. The terminal, however, also establishes a secure link with the database. The secure link may be created by putting the terminal and the server physically close to each other. That is, a mobile terminal establishes a secure link with a newly added appliance, and the same mobile terminal also establishes a secure link with the database server. In such a scenario the branding of the appliance to the environment is a two-step procedure, where the terminal, as a trusted introducer, is used by the server and the appliance to establish a secure link. First, the terminal exchanges public keys with the appliance, and also exchanges the public key of the database with the appliance. The terminal then is brought near the database, and exchanges public keys with the database, as well as the public key of the appliance with the database. After this exchange, the appliance will not trust another terminal as an introducer unless the appliance is reset via a maintenance procedure.

Figure 4:
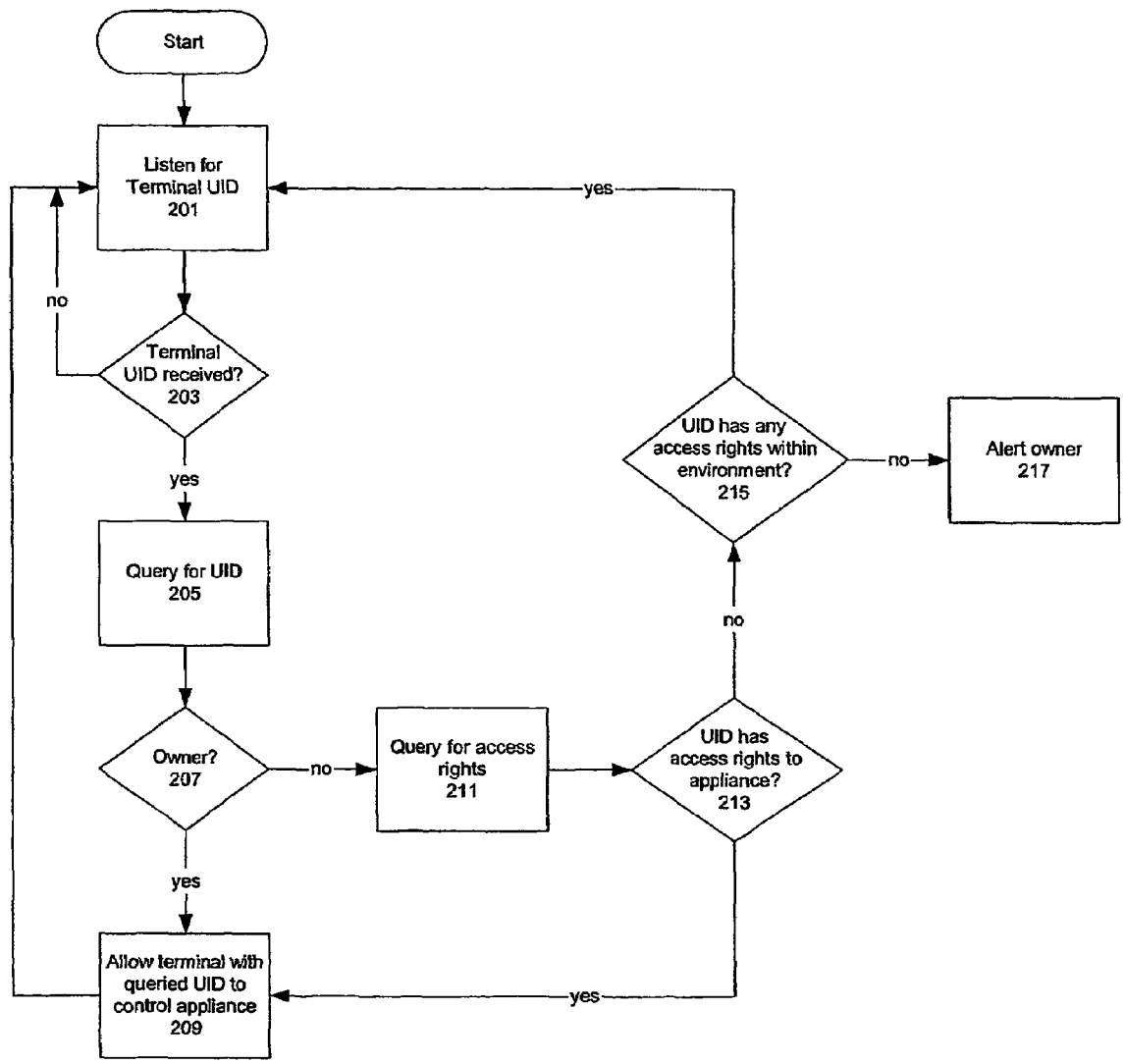
FIG. 4 shows a flowchart of a user authorization process to use an appliance.

With reference to FIG. 4, when a user wants to control an appliance, the appliance authenticates the terminal as an authorized terminal to control that appliance. The UID of the controller terminal is used as a key to the appliance. Appliances continuously listen for terminal UIDs in steps 201 and 203. Upon receiving a UID, the appliance queries the database 109 in step 205 to determine the UID's group. If the UID belongs to an owner terminal, as determined in step 207, the appliance grants control to the terminal in step 209, as owner terminal(s) have complete access to all appliances at all times. If the UID is not an owner, the appliance queries the database for the UID's access rights for that specific appliance and within the environment as a whole, in step 211. If the UID has access rights to the appliance at the present date and time, the appliance grants control to the terminal in step 209. If the UID does not have access rights, the appliance determines whether the terminal has any access rights within the environment, in step 215. If the terminal does not have any access rights within the environment, the appliance attempts to alert the owner that an unauthorized terminal is in the environment, in step 217. This may be accomplished by sending a message via email, SMS, wireless pager, or the like. If the UID does have access rights within the environment, however, the appliance may simply ignore the terminal and continue to listen for another UID. Optionally (not shown), the server may perform steps 215 and 217 after it has received the UID from the appliance in step 205.

In one embodiment, an owner terminal may be used to grant or change other terminals' access rights. These other terminals can have different levels of access, as discussed above. To authorize a new terminal, both a terminal with administrative privileges (i.e., an owner) and the terminal to which the access rights are to be given are in close proximity to each other when the database is updated. This provides an additional level of security by ensuring that only authorized persons can give access rights to terminals. The UID codes between the terminals are exchanged over a short-range link. Additional security measures such as passwords can also be utilized in the authorization process. In another embodiment, the terminals do not need to be physically close to each other, but rather the database can be updated with the new information.

In some aspects of the invention, regardless of the wireless implementation, the terminals and appliances continuously transmit their UIDs and listen for other UIDs. This allows the terminals and appliances to automatically "hear" each other when they are near each other. The UIDs allow listening devices to determine whether it has previous knowledge about the other nearby device(s), and react accordingly. For instance, when a terminal receives a UID, the terminal uses the UID to determine whether the terminal has information regarding how to control the appliance.

The central server in the smart environment polls the appliances. This can be performed continuously, hourly, daily, etc. When the server determines that an appliance is missing from the network (i.e. it is not responding when it should be), the server may automatically notify the owner controller or, optionally, all controllers.

Using the invention, keys (UIDs) can easily be revoked or modified by reprogramming or resetting the information in the terminal and/or database. Also, keys may easily be set to have different access levels, as described above. The key may be a built in function in existing terminals, such that new wireless hardware is not required to practice the invention. However, one can easily envision a specialized terminal for use with the invention that, at a minimum, stores key information and can perform short-range wireless communications.

An owner or administrator can also use the system of the present invention as a child lock for selected appliances. For example, the system may be used to prevent a child from turning on an oven (or other appliance) without explicit permission from the parent. That is, if the child tries to turn on the oven, the oven would not respond because it would only hear the child's key (which, in this example, does not have authority to use the oven). However, if the parent enters the kitchen and the oven detects the parent by receiving the parent's key, the oven could then be turned on (because the parent's key has authority to use the oven). In one aspect of the invention, the oven (or other appliance) would switch off once the authorized key went out of range unless an authorization switch was activated on the oven (or other appliance for which protection is sought) while it was under the parent's authorization. Similar protection schemes can easily be envisioned using the inventive system. In another aspect, the oven (or other appliance) would remain on even after the authorized key went out of range.

In one aspect of the invention, the appliances report information to the database regarding when the appliance was used, by whom the appliance was used, and for what purpose the appliance was used. Some appliances, for example a coffee maker, may only report when and who used the appliance (as the only purpose is to make coffee). However, other appliances, such as televisions, cable television control boxes, computers, and the like, may also report programs watched, games played, applications executed, websites visited, and the like. This allows owners (such as parents) to determine how the appliances are used, and refine access rights based on the reporting information.

Using a smart environment as described above, it is possible to remotely apply for and admit access to a user who does not presently have access rights within the environment. That is, if the owner terminal is not physically present in the environment, and a new terminal needs to be granted access rights, the new terminal may apply for access rights to and receive access rights from a remote owner terminal.

Figure 5:
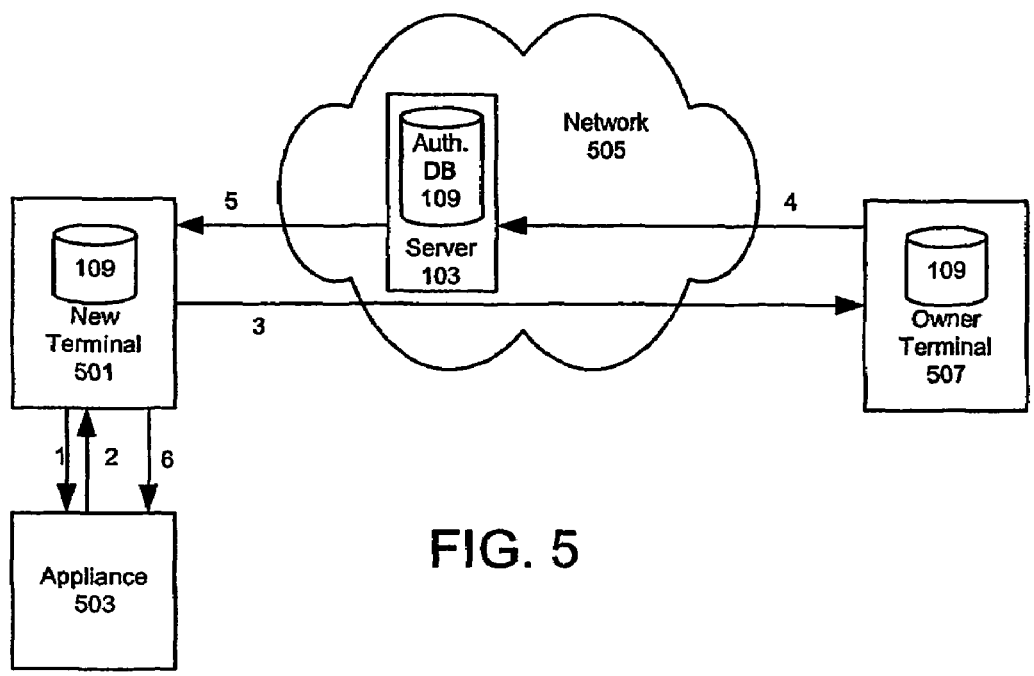
FIG. 5 shows a data flow diagram of a first embodiment of the invention.

In one embodiment, with reference to the ordered data flow diagram in FIG. 5, the authorization database 109 is stored on a network server 103 (optionally located outside the smart environment, as shown) and synchronized with a terminal 501. The new terminal attempts to control an appliance 503 by transmitting its UID to the appliance. The appliance, not recognizing the UID, rejects the control request because the new terminal does not have access to the appliance. The appliance may reply with the IP address, telephone number, or other similar address of the owner terminal from which authorization can be requested. The new terminal 501 then requests authorization rights from the owner terminal 507 via IP packet request, data channel in a mobile telecommunications network, or the like. When the owner terminal 507, as shown, is physically located remotely from the smart environment in which the appliance is located, the request is sent through a network 505, such as the Internet, to the owner terminal. The request, when sent via a mobile telecommunications network, will prompt the owner on his or her mobile telecommunications device. The owner may choose whether or not to grant access to the requesting terminal and, if so, during what days and/or times the terminal may have access.

The owner terminal, having received the request and a corresponding response from the user, sends the updated authorization rights to the database 109 in the server 103. The server then updates the terminal's copy of the database by synchronizing the terminal's copy with the server's updated copy. After the new terminal's database is synchronized, it will also contain the new authorization rights. Now new terminal 501 can successfully control the appliance 503. In some embodiments, the appliance's copy of the database may also be updated/synchronized before the terminal can control the appliance. The terminal may have rights to update the appliance's copy of the DB, depending on the rights granted by the owner from the owner terminal.

Figure 6:
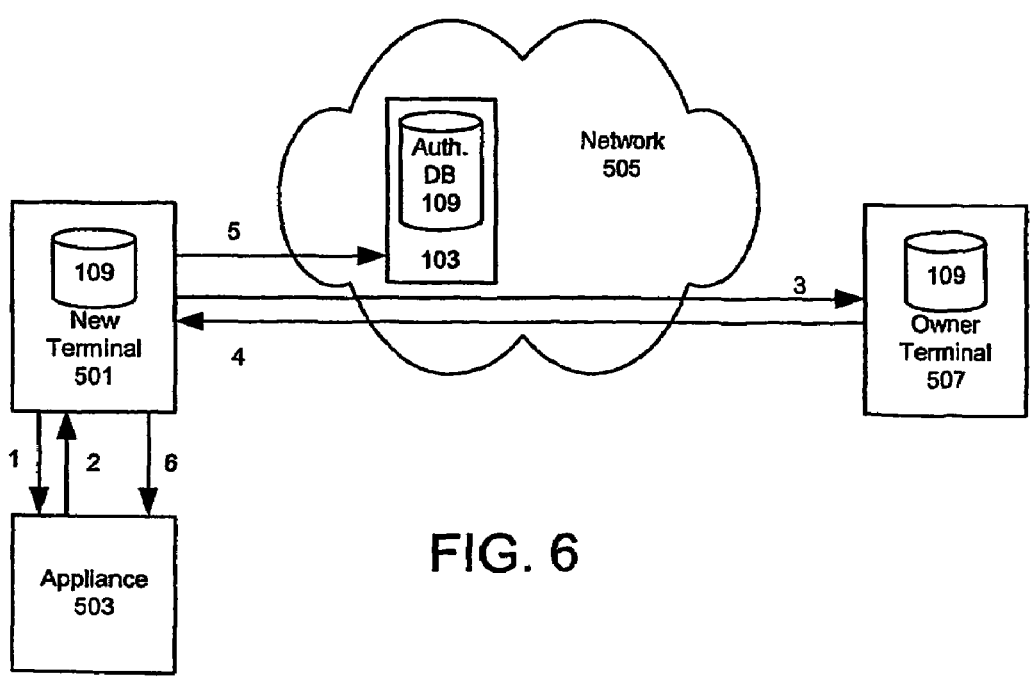
FIG. 6 shows a data flow diagram of a second embodiment of the invention.

In another embodiment, with reference to FIG. 6, the authorization database is stored in a terminal, and may be copied to a network server. Changes to the database can be made directly to a terminal's copy of the database. The terminal and server copies of the database are synchronized each time any changes are made in either location. The new terminal 501 attempts to control the appliance 503 by transmitting its UID to the appliance. The appliance, not recognizing the UID, rejects the control request because the new terminal does not have access to the appliance. The new terminal then requests authorization rights from the owner terminal 507, based on contact information returned by the appliance. When the owner terminal 507, as shown, is physically located remotely from the smart environment in which the appliance is located, the request is sent through a network 505, such as the Internet, to the owner terminal. The owner terminal, having received the request, sends updated authorization rights to the new terminal's copy of the database. The updated authorization rights may allow for the new terminal to control the requested appliance, optionally only at predetermined days and/or times. The new terminal then synchronizes its updated database with the copy of the database 109 stored in the network server 103. The new terminal 501 may now control the appliance 503. Optionally, a copy of the database stored in the appliance is updated before the terminal can control the appliance.

It should be appreciated that other configuration are possible, in addition to those configurations shown in FIGS. 5 and 6. For instance, there may be no network copy of the database, and the database may be synchronized between devices and appliances. That is, all access rights may be stored on terminals, and each time the terminal attempts to control an appliance, the terminal sends its access rights to the appliance, as further described below. Alternatively, the database may only be located at a network location and not in individual appliances or terminals.

The rights granted to the new terminal by the remote owner terminal may be fixed or temporary. For instance, while an owner is on vacation, away from his or her smart environment, the owner may need to grant access to the smart environment to a friend who offered to water the plants. If the owner forgets to grant access before he or she leaves, the friend can still request access from the remote owner when the friend gets to the smart environment and realizes that he or she has no key. The remote owner may then grant temporary rights to the smart environment by granting access rights to the friend to allow the friend to enter the environment without triggering an alarm or other notification event. The rights granted by the owner may be permanent or temporary, depending on the days and/or times when the owner grants permission to the friend to access the environment.

Figures 7, 10:
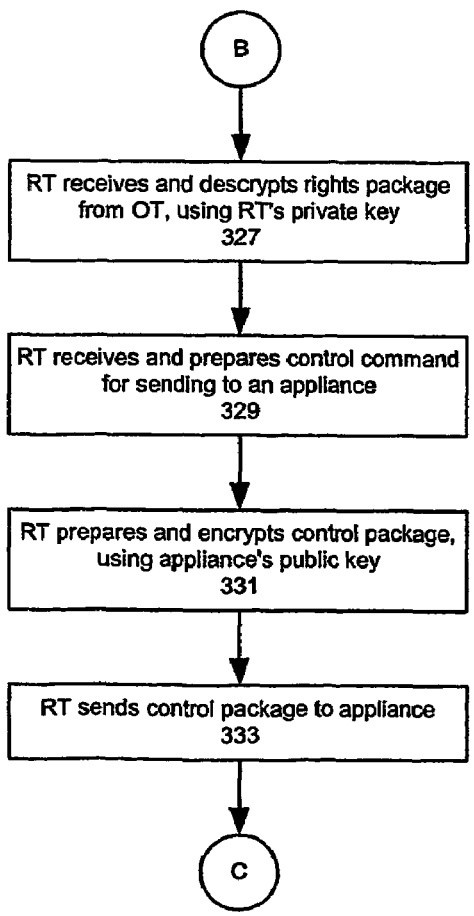
FIG. 7 shows a ticket definition.
FIG. 10 shows a flowchart for a requesting terminal to receive control rights from an owner terminal, and sending control information to an appliance.

With reference to FIG. 7, the authorization information provided by the remote owner terminal may include the appliance or object UID, the Function ID, the validity period of the rights, and the level of rights granted. The level of rights is used when an appliance has multiple levels of access for a single function. For instance, in a television, a function may be 'changing channels' while the level of rights may specify which channels the user is authorized to change the channel to. As another example, where the appliance is an electronically controlled door, the Feature ID may correspond to the feature of opening the door, while the level of rights may further specify the days and time during which the newly admitted terminal may open the door (such as only during regular business hours). The validity period typically specifies a date on which the granted rights expire, or a number of days during which the rights are valid.

Because the remote user granting authority and the local user receiving authority may be communicating over various networks, security precautions may be used to ensure secure communications. In one embodiment, public-private key encryption is used in conjunction with known hashing techniques to provide secure communications. In other embodiments, other forms of encryption or privacy technology may be used, as are known in the art and provide secure communications between the local and remote users.

Figure 8:
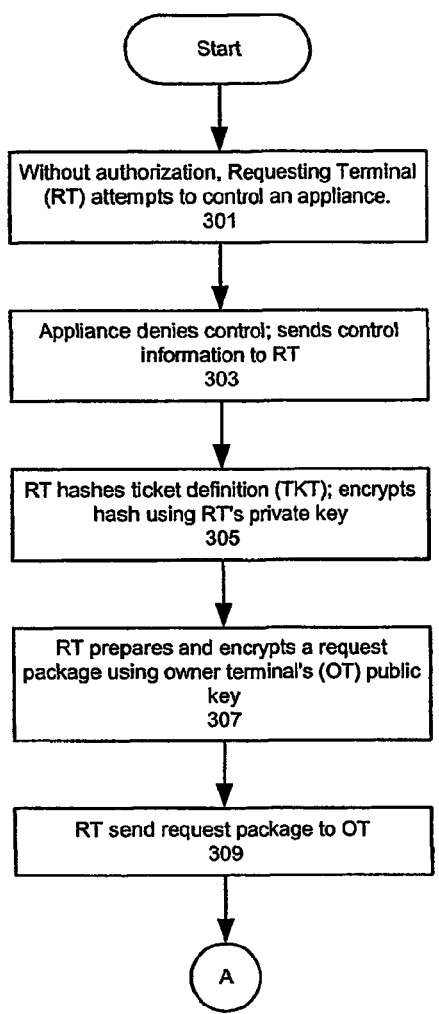
FIG. 8 shows a flowchart for a user terminal to request access to an appliance.

With reference to FIGS. 8-11, a method for applying for and remotely granting control rights will now be explained. FIG. 8 shows a portion of the method performed when a terminal initially attempts to control an appliance without proper authorization. In step 301, a requesting terminal (RT) attempts to control an appliance for which the terminal does not have authorization. In step 303, after the appliance receives a control request from the requesting terminal, the appliance may determine that the requesting terminal does not have proper authorization based on information in database 109, or some other source. In response to the control request, the appliance may send to the requesting terminal a ticket definition, an owner terminal's (OT) public key, and the owner terminal's corresponding address. The ticket definition may include formatting for information specific to that appliance, such as an identification of various functions of the appliance and the rights levels associated with each function. Ticket definitions may vary from appliance to appliance because each appliance may have different functions and levels of rights for each function. The OT address may be a network address, telephone number, or any other destination identifying attribute to which information may be sent.

In some embodiments, hashing may be used to provide additional security. Hashing, generally, is the process of deriving a shorter alphanumeric string of text (a hash) from a longer alphanumeric string of text (the input). A hashing algorithm is generally designed to generate a hash with a very low probability that hashing two different text strings will generate an identical hash value. A sending device generates a hash of a message to be sent, encrypts the hash and the message itself, then transmits both to the receiving unit. The receiving device decrypts the message and the hash, and then produces another hash from the decrypted message. By comparing the two hashes, the receiving unit can determine with relatively high probability whether the data was altered in transit. That is, if the two hashes are identical, it is very unlikely that an intruder modified the message in transit.

In step 305, the requesting terminal may hash the ticket definition as a signature for a transmission to the owner terminal, and encrypt the hash using the requesting terminal's private key. In step 307, the ticket definition, the encrypted hash of the ticket definition, the requesting terminal's public key, and the RT's certificate authority (CA) certificate may then be packaged and encrypted using the owner terminal's public key. The requesting terminal may send the control request package to the owner terminal in step 309.

Figure 9:
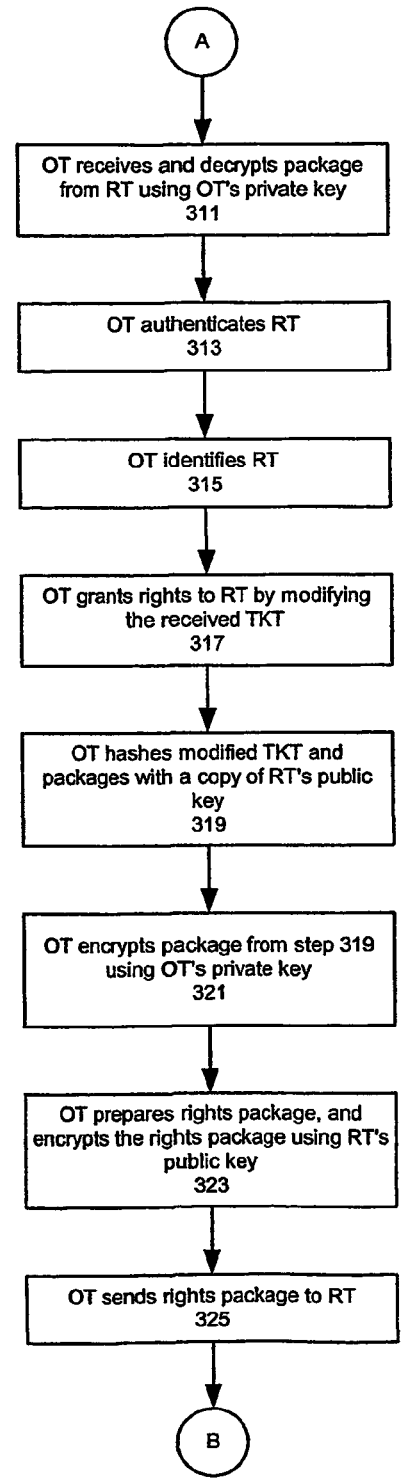
FIG. 9 shows a flowchart for an owner terminal to remotely grant access to an appliance by a requesting terminal.

FIG. 9 shows a portion of the method that is performed by an owner terminal after having received a control request package from a requesting terminal. In step 311, the owner terminal receives the control request package from the requesting terminal. The owner terminal may decrypts the package using its private key. After decryption, in step 313, the owner terminal may authenticate that the requesting terminal's public key is authentic using the enclosed CA certificate. In step 315, the owner terminal may identify the requesting terminal. This may be performed by hashing the received ticket definition, decrypting the received hashed ticket definition using RT's public key, and comparing the two hashes. If the two hashes are the same, then the requesting terminal has been successfully identified.

After authentication and identification of the requesting terminal, the owner's terminal may grant access privileges to the requesting terminal in step 317. The granting terminal may do this by modifying the information contained in the ticket definition with new or different access privileges. In step 319, the owner terminal may hash the modified ticket definition and package the hash with a copy of RT's public key. The encrypted hash may be used as a signature to verify the rights sent back to RT. In step 321, the owner terminal may encrypt the package containing the requesting terminal's public key and the hash using the owner terminal's private key. This package may be used later to ensure that only the identified requesting terminal can use the rights granted in the ticket definition, and also to verify those rights granted to RT.

The owner terminal, in step 323, packages in a control rights package, the modified ticket definition and the encrypted package containing RT's public key and the hash of the modified ticket definition. The control right package may also be encrypted using RT's public key. In step 325, the control rights package may be transmitted back to the requesting terminal via one or more communications networks or directly from OT to RT.

FIG. 10 shows a portion of the method as performed by a requesting terminal after receiving a control rights package from an owner terminal. In step 327, the requesting terminal receives and decrypts the control rights package using its private key. Optionally (not shown), when the requesting terminal includes a display, the user may view the access granted by the owner. Separately, in step 329, the requesting terminal receives and prepares a control command. The control command may be from a user of the requesting terminal or from some other source controlling the terminal. The control command may be hashed, and the hash encrypted using RT's private key. This encrypted hash may be used as a signature for a control package to be sent to an appliance. In step 321, the requesting terminal prepares a control package to send to an appliance. The control package contains identification, authorization, and control information for use by the appliance. The requesting terminal may assemble in the control package, the control command, the encrypted hash of the control command, the modified ticket definition, and the encrypted copy of the hash and RT's public key (from step 321) as received from OT. The entire control package may then be encrypted using the appliance's public key. In step 333, the requesting terminal may send the control package to the appliance for which access rights were granted by OT.

Figure 11:
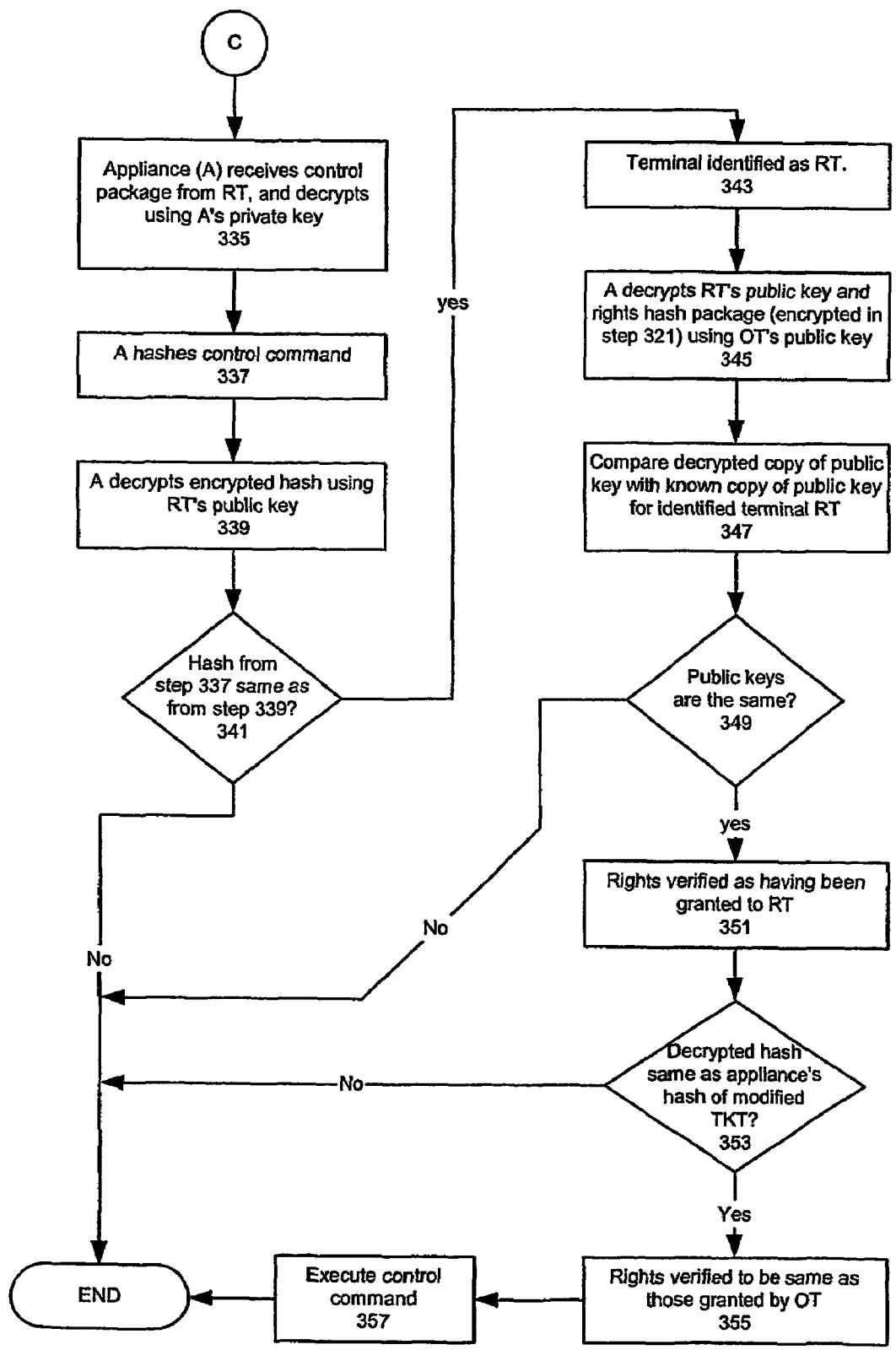
FIG. 11 shows a flowchart for an appliance to authenticate control information.

FIG. 11 shows a portion of the method as performed by an appliance after receiving a control package from a terminal. In step 335, the appliance receives and decrypts (using the appliance's private key) the control package received from the requesting terminal. After decrypting the message, the appliance may perform a data integrity check based on the control command in steps 337 and 339. The appliance may hash the received control command in step 337, and decrypt (using RT's public key) the encrypted hash of the control command received from RT, in step 339. The appliance compares the two hashes in step 341. If the two hashes are the same, then the data integrity check is successful, and the controlling terminal is identified as RT in step 343. If the hashes are not the same, then the control process may terminate, optionally informing the terminal why the control command was not accepted (namely, because there is a data integrity error or the controlling terminal could not be identified).

In step 345, the appliance may decrypt the package containing the encrypted public key and hash (from step 321) using OT's public key. The appliance may then, in steps 347 and 349, compare the decrypted public key with a known or verified copy of RT's public key. If the keys are the same, then control is passed to step 351. In step 351, the ticket definition presented by RT is verified to be authentic because OT's public key was successfully used to decrypt RT's public key. That is, the appliance determines that the rights granted in the ticket definition were in fact granted to RT because if the decrypted public key did not match RT's public key, then the rights were not in fact granted to RT. If the keys are not the same, then the control process may terminate, optionally informing the terminal why the command was not accepted (namely, because the terminal granting rights to RT could not be authenticated/verified).

Ins step 353, the appliance compares the decrypted hash (decrypted in step 345, above) to a hash of the received ticket definition that is created by the appliance. This is performed to verify that the rights presented by the requesting terminal are the same rights as those granted by the owner terminal. If the two hashes are the same, then in step 355 the rights are verified to be the same as those rights originally granted by the owner terminal, and control passes to step 357. If the hashes are not the same, then the control process may terminate, optionally informing the terminal why the command was not accepted (namely, because the ticket definition has been modified without authorization).

Having verified the rights were granted to RT, the identity of RT, and that the rights presented by RT are the same rights granted by OT, the appliance may execute the control command in step 357.

In some embodiments, an appliance may maintain a list of terminal IDs that have been recently removed but the access rights have not been updated to the authentication database in the terminal or in the network, depending on where the database is stored. That is, when rights granted in a ticket definition expire, the terminal whose rights expired may be added to a "blacklist" until such time as the expired rights are updated in the database. Also, just as an owner terminal may grant additional rights, and owner terminal may modify a ticket definition so as to reduce or eliminate a requesting terminal's rights. In such as case where the rights are terminated altogether, an appliance receiving such a ticket definition may add the terminal to a blacklist until the rights are revoked in the central database. A terminal may be added to the blacklist locally or remotely.

Wherever the above description refers to method steps, the method steps may be encoded in computer readable instructions stored in a memory, such that when the computer readable instructions are executed by a processor, they cause the device in which the processor is located to perform the method steps.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method comprising:
wirelessly receiving a rejection of a control request from an appliance, wherein the rejection includes access information from the appliance, a ticket definition and a public key associated with an administrator terminal, further wherein the access information comprising address information corresponding to the administrator terminal and an authorization template corresponding to the appliance, and the ticket definition comprising one or more appliance function definitions and one or more access right levels associated with each appliance function;
in response to receiving the rejection of the control request, wirelessly sending an access request to the administrator terminal, based in part on the access information;
wirelessly receiving user input authorizing one or more access rights from the administrator terminal; and
wirelessly controlling the appliance based on the access rights authorized and the authorization template.

2. The method of claim 1, wherein sending the access request to the administrator terminal further includes:
hashing the ticket definition;
encrypting the hash using a requesting terminal private key;
encrypting the encrypted hash, the ticket definition, a requesting terminal public key, and a certificate of authority with a public key corresponding to the administrator terminal to produce a control request package; and
sending the control request package.

3. The method of claim 1, wherein the access rights authorized is a different set of rights than a set of rights requested.

4. An apparatus, comprising:
a processing unit;
a transceiver;
a memory storing computer readable instructions that, when executed by the processing unit, cause the apparatus to perform:
wirelessly receiving a rejection of a control request from an appliance, wherein the rejection includes access information from the appliance, a ticket definition and a public key associated with an administrator terminal, further wherein the access information comprising address information corresponding to the administrator terminal and an authorization template corresponding to the appliance, and the ticket definition comprising one or more appliance function definitions and one or more access right levels associated with each appliance function;

in response to receiving the rejection of the control request, wirelessly sending an access request to the administrator terminal, based in part on the access information;

wirelessly receiving user input authorizing one or more access rights from the administrator terminal; and wirelessly controlling the appliance based on the access rights authorized and the authorization template.

5. The apparatus of claim 4, wherein the memory further stores computer readable instructions that, when executed by the processor, cause the apparatus to perform:

hashing the ticket definition;

encrypting the hash using a requesting terminal private key;

encrypting the encrypted hash, the ticket definition, a requesting terminal public key, and a certificate of authority with a public key corresponding to the administrator terminal to produce a control request package; and sending the control request package.

6. One or more computer readable media storing computer readable instructions, that when executed by a processor, perform:

wirelessly receiving a rejection of a control request from an appliance, wherein the rejection includes access information from the appliance, a ticket definition and a public key associated with an administrator terminal, further wherein the access information comprising address information corresponding to the administrator terminal and an authorization template corresponding to the appliance and the ticket definition comprising one or more appliance function definitions and one or more access right levels associated with each appliance function;

in response to receiving the rejection of the control request, wirelessly sending an access request to the administrator terminal, based in part on the access information;

wirelessly receiving user input authorizing one or more access rights from the administrator terminal; and wirelessly controlling the appliance based on the access rights authorized and the authorization template.

7. The one or more computer readable media of claim 6, the instructions further performing:

hashing the ticket definition;

encrypting the hash using a requesting terminal private key;

encrypting the encrypted hash, the ticket definition, a requesting terminal public key, and a certificate of authority with a public key corresponding to the administrator terminal to produce a control request package; and sending the control request package.

8. A method comprising:

wirelessly receiving an appliance access request for access rights from a control terminal, wherein the appliance access request was sent in response to an appliance rejecting control by the control terminal, and further wherein the rejection of control comprises a ticket definition and a public key, wherein the ticket definition includes one or more appliance function definitions and one or more access rights levels associated with each appliance function;

prompting for input based on the received access request, wherein the prompting includes providing information such that a user is able to determine whether to grant the access rights;

receiving input based on the received access request, wherein the input received corresponds to either granting or denying the request;

wirelessly sending a response to a control terminal, wherein the control terminal may accesses the appliance in accordance with the response if the response granted access to the appliance.

9. The method of claim 8, wherein the response farther includes authorization information comprising an appliance identifier matching an identifier of the appliance, rights granted, and a duration of the grant; and wherein the fights granted in the response is a set of rights different than the fights requested in the appliance access request.

10. The method of claim 8, further comprising:

wirelessly receiving a control request package;

decrypting the control request package using an administrator terminal private key; authenticating a control terminal public key based on a certificate of authority; and identifying the control terminal by hashing a ticket definition and decrypting a hashed ticket definition using the control terminal public key and comparing the two hashes, wherein the control request package comprises the hashed ticket definition, the ticket definition, the requesting terminal public key, and the certificate of authority with a public key corresponding to the administrator terminal.

11. An apparatus comprising:

a processing unit;

a transceiver;

a memory storing computer readable instructions that, when executed by the processing unit, cause the apparatus to perform:

wirelessly receiving an appliance access request for access rights from a control terminal, wherein the appliance access request was sent in response to an appliance rejecting control by the control terminal, and further wherein the rejection of control comprises a ticket definition and a public key, wherein the ticket definition includes one or more appliance function definitions and one or more access rights levels associated with each appliance function;

prompting for input based on the received access request, wherein the prompting includes providing information such that a user is able to determine whether to grant the access rights;

receiving input based on the received access request, wherein the input received corresponds to either granting or denying the request;

wirelessly sending a response to a control terminal, wherein the control terminal may accesses the appliance in accordance with the response if the response granted access to the appliance.

12. The apparatus of claim 11, wherein the response further includes authorization information comprising an appliance identifier matching an identifier of the appliance, rights granted, and a duration of the grant; and wherein the rights granted in the response is a set of rights different than the rights requested in the appliance access request.

13. The apparatus of claim 11, wherein the memory further stores computer readable instructions that, when executed by the processor, cause the apparatus to perform:

receiving a control request package;

decrypting the control request package using an administrator terminal private key;

authenticating a control terminal public key based on a certificate of authority; and identifying the control terminal by hashing a ticket definition and decrypting a hashed ticket definition using the control terminal public key and comparing the two hashes, wherein the control request package comprises the hashed ticket definition, the ticket definition, the requesting terminal public key, and the certificate of authority with a public key corresponding to the administrator terminal.

14. A computer readable medium storing computer readable instructions, that when executed by a processor, perform:

wirelessly receiving an appliance access request for access rights from a control terminal, wherein the appliance access request was sent in response to an appliance rejecting control by the control terminal, and further wherein the rejection of control comprises a ticket definition and a public key, wherein the ticket definition includes one or more appliance function definitions and one or more access rights levels associated with each appliance function;

prompting for input based on the received access request, wherein the prompting includes providing information such that a user is able to determine whether to grant the access rights;

receiving input based on the received access request, wherein the input received corresponds to either granting or denying the request;

wirelessly sending a response to a control terminal, wherein the control terminal accesses the appliance in accordance with the response if the response granted access to the appliance.

15. The one or more computer readable media of claim 14, wherein the response further includes authorization information comprising an appliance identifier matching an identifier of the appliance, rights granted, and a duration of the grant; and wherein the rights granted in the response is a set of rights different than the rights requested in the appliance access request.

16. The one or more computer readable media of claim 14, the instructions further performing:

wirelessly receiving a control request package;

decrypting the control request package using an administrator terminal private key;

authenticating a control terminal public key based on a certificate of authority; and identifying the control terminal by hashing a ticket definition and decrypting a hashed ticket definition using the control terminal public key and comparing the two hashes, wherein the control request package comprises the hashed ticket definition, the ticket definition, the requesting terminal public key, and the certificate of authority with a public key corresponding to the administrator terminal.

\* \* \* \* \*

UNITED STATES PATENT AND TRADEMARK OFFICE
CERTIFICATE OF CORRECTION

PATENT NO.        : 7,493,651 B2                                    Page 1 of 1
APPLICATION NO.   : 10/476497
DATED             : February 17, 2009
INVENTOR(S)       : Marko Vänskä et al.

It is certified that error appears in the above-identified patent and that said Letters Patent is hereby corrected as shown below:

In Column 16, Claim 9, Line 8:
    Please delete "farther" and insert --further--.

In Column 16, Claim 9, Line 11:
    Please delete "fights" and insert --rights--.

In Column 16, Claim 9, Line 13:
    Please delete "fights" and insert --rights--.

Signed and Sealed this

Eighth Day of September, 2009

David J. Kappos
*Director of the United States Patent and Trademark Office*